United States Patent Office 3,211,513
Patented Oct. 12, 1965

3,211,513
PROCESS FOR DYEING AND PRINTING
REACTIVE DYESTUFFS
Paul Ulrich and Heinz Peter Schaub, Basel, Hans Heinrich Bosshard, Binningen, and Eugen Johann Koller, Oberwil, Switzerland, assignors to Ciba Corporation, New York, N.Y., a corporation of Delaware
No Drawing. Filed Aug. 14, 1962, Ser. No. 216,743
Claims priority, application Switzerland, Aug. 17, 1961, 9,625/61
10 Claims. (Cl. 8—54.2)

The present invention provides a process for dyeing and printing fibrous material with reactive dyestuffs or reactive dyestuff intermediates. As is known, reactive dyestuffs are dyestuffs which during the dyeing or printing process enter into a covalent bond with the material to be dyed, and this is in general accompanied by elimination of the reactive substituent of the dyestuff. The speed at which the bond between the dyestuff and the substratum is formed depends, on one hand, on the dyeing conditions, such as temperature, pH-value of the dyebath or printing paste, and on the other hand on the reactivity of the reactive grouping of the dyestuff. It is known that in this respect considerable differences between various reactive dyestuffs exist. The present invention provides a process for dyeing or printing fibrous material with reactive dyestuff compounds, viz reactive dyestuffs proper or reactive dyestuff intermediates. According to the new process the agent used to promote the reaction between the dyestuff and the substratum is a tertiary amine or a water-soluble salt thereof, used in a catalytic proportion.

It is of advantage to add to the dye liquor or printing paste at least one tertiary amine whose nitrogen atom or atoms, in the case of a polyamine, is not a ring member/are not ring members of a ring system having aromatic character nor bound directly to an aromatic ring system.

Tertiary amines suitable for use in the present process may belong to the aliphatic or the heterocyclic series and correspond, for example, to the formula (1) 

or (2) 

in which $R_1$ and $R_2$ each represents an aliphatic radical with 1 to 4 carbon atoms such, for example, as an alkyl, hydroxyalkyl or alkoxyalkyl group, $R_3$ stands for an aliphatic radical with 1 to 10 carbon atoms such, for example, as an alkylene or alkenyl radical, X for a hydrogen atom or a possibly substituted hydroxyl group or for the group

or the group

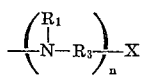

(where $n=1$, 2, 3 or 4) or a possibly substituted aryl group, $R_4$, $R_5$ and $R_6$ each represents an aliphatic radical with 1 to 4 carbon atoms, for example an alkylene radical, and Y stands for a nitrogen atom or a =CH-group.

Apart from the free amines their salts are likewise suitable.

It is of advantage to use amines which as such, or in the form of their salts, are soluble in the dyebath or in the printing paste in the concentrations used. Apart from one or several tertiary amino groups the amines may contain further substituents that do not react with the reactive dyestuffs under the conditions to be used in the present process. In such substituent there may be mentioned halogen atoms, nitro groups, alkoxy groups or hydroxyl groups. Preferred use is made, however, of amines that contain only carbon and hydrogen atoms in addition to at least one tertiary amine nitrogen atom.

Suitable aliphatic amines of the Formula 1 are for example those of the formula (3) 

where $R_3$ has the above meaning and Z stands for a hydrogen atom or a hydroxyl group. Thus, the compounds concerned are dimethylallylamine, dimethyl-$\beta$-hydroxyethylamine or dimethyl-$\beta$-ethoxyethylamine. Valuable results are also obtained with aliphatic amines of the formula (4) 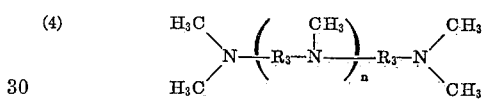

where $R_3$ has the above meaning and $n=1, 2, 3$ or 4. To this class of compounds belong the polyalkylene-polyamines such, for example, as pentamethyl-diethylenetriamine or hexamethyl-triethylenetetramine. Good results have also been achieved with aliphatic amines of the formula (5) 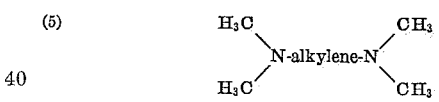

in which the alkylene radical contains 1 to 10 carbon atoms such, for example, as 1:2-bis-dimethylaminoethane, 1:4-bis-dimethylamino-butane or 1:6-bis-di-methylamino-hexane. Very specially valuable representatives of the aliphatic amines are found among those which correspond to the formula (6) 

in which the alkyl radical contains 1 to 4 carbon atoms. Such compounds are, for example, dimethyl ethylamine, dimethyl propylamine, dimethyl isopropylamine, and above all trimethylamine.

As a rule, these aliphatic amines should not contain more than 6 carbon atoms for every tertiary amino group.

Suitable heterocyclic amines of the Formula 2 are those tertiary amines of which the nitrogen atom or both nitrogen atoms belong(s) at the same time to several rings, that is to say that the nitrogen atom of the tertiary amino group(s) forms a bridge member between several rings. These rings may contain substituents such as halogen atoms or nitro, hydroxyl, keto or alkoxy groups, and they may also be condensed with other rings or cyclic systems which in themselves may likewise contain substituents. It is of advantage to use heterocyclic amines that contain only carbon and hydrogen atoms in addition to the tertiary amino groups. Likewise, it has been found advantageous when no more than 8 carbon atoms for every tertiary group are present. Suitable representatives of this group are, for example, amines of the formula (7) 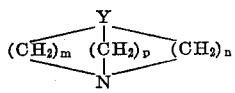

where Y has the above meaning and m, n and p each is a whole number from 1 to 4. As examples there may be mentioned inter alia pyrrolicidine, 1-aza bicyclo (2:2:1)-heptane, quinuclidine, quinuclidone, 1 - aza - bicyclo-(3:2:1)-octane, 1-aza-bicyclo-(3:2:2)-nonane and more expecially 1:4-diaza-bicyclo-(2:2:2)-octane (also called triethylenediamine).

It is also possible to use a combination of two or more amines.

The water-soluble salts of the aforementioned tertiary amines which, if desired, may be used in place of the free amines, are derived from the usual inorganic or organic acids, for example sulphuric, hydrochloric, phosphoric, acetic, formic, propionic, chloracetic, oxalic or tartaric acid.

The reactive dystuffs to be used in the present process are advantageously those of the water-soluble kind, for example organic dyestuffs from diazo or coupling components containing carboxyl groups, sulfonic acid groups or aliphatically bound sulfuric acid ester groups. As relevant reactive groupings there may be mentioned epoxy, ethyleneimino, isocyanate, isothiocyanate, carbamic acid aryl ester groups, the propiolic acid amide grouping, mono- and dichloro-crotonylamino group, chloracrylamino groups, acrylamino and vinylsulfone groups and above all groupings containing a labile substituent which is easy to split off with entrainment of the bond electron pair, for example sulfohalide groups, aliphatically bound sulfuric acid ester groups and aliphatically bound sulfonyloxy groups, also halogen atoms, more especially an aliphatically bound chlorine atom. These labile substituents are advantageously in position γ or β of an aliphatic radical which is bound to the dyestuff molecule directly or through an amino, sulfone or sulfonamide group. In the case of suitable dyestuffs in which the labile substituent is a halogen atom these mobile halogen atoms may also be present in an aliphatic acyl radical, for example in an acetyl radical, or in position β or in positions α and β of a propionyl radical, or preferably in a heterocyclic radical, for example in a pyrimidine or a pyridazine ring, or above all in a triazine ring. The dyestuffs contain with advantage a grouping of the formula

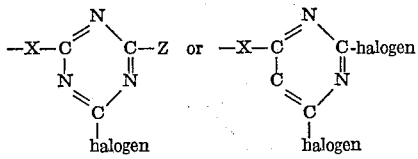

in which X represents a nitrogen bridge and Z a hydrogen atom, a possible substituent amino group, an etherified hydroxyl or mercapto group, a halogen atom or an alkyl, aryl or aralkyl group, and A stands for a hydrogen or halogen atom. The halogen atoms are, for example, bromine atoms or preferably chlorine atoms.

It is of special advantage to use dyestuffs that contain the grouping of the formula

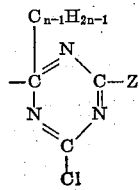

in which n is a whole number from 1 to 4 and Z has the above meaning.

Further suitable dyestuffs are those which contain diphenoxy-triazine groups and those which contain a grouping of the formula

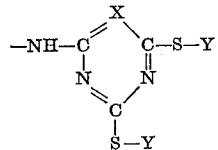

where =X— stands for

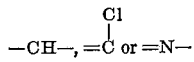

and Y represents a group

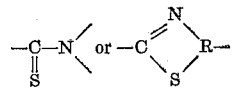

where R represents an ortho-arylene radical.

Further suitable reactive groupings are the following radicals: Trichloropyridazine, dichloroquinoxaline, dichlorobutene, halogenated pyridazone, sulfonyl-dichloropropylamide, allylsulfone, allylsulfide, 2-halogeno-benzthiazolecarbamide and β-sulfato-propionamide.

A wide variety of organic dyestuffs are suitable for the present process, for example oxazine, triphenylamethane, xanthene, nitro, acridone dyestuffs, metallized and metal-free azo, anthraquinone and phthalocyanine dyestuffs. From the series of the azo dyestuffs there may be mentioned for example disazo or trisazo dyestuffs, and above all monoazo dyestuffs. A large number of such reactive azo dyestuffs are known so that there is no need to deal with them in greater detail in this connection.

From the series of the anthraquinone dyestuffs there may be mentioned especially 1-amino-4-bromanthraquinone-2-sulfonic acid and the dyestuffs derived from 1-4-diaminoanthraquinone-2-sulfonic acid. These and other anthraquinone dyestuffs are manufactured by known methods. As suitable phthalocyanine dyestuffs there may be mentioned more especially those which are derived from nickel or copper phthalocyanine-sulfonamides whose molecule contains at least two free sulfonic acid groups and which contain in at least one sulfonamide radical a group comprising at least one labile halogen atom.

The present process may also be performed with the use of vat dyestuffs and dispersion dyestuffs having the characteristics of reactive dyestuffs.

The present process is suitable for dyeing or printing a large variety of fibrous materials, such as paper or leather, above all textiles, for example those made from animal fibers such as silk, and above all those consisting of cellulose fibers including both native cellulose fibers such as linen or cotton, as well as fibers from regenerated cellulose such as rayon (viscose) or staple rayon.

As mentioned above the suitable tertiary amines are used in catalytic proportions. As is usual, "catalytic proportion" is understood to mean an amount that is substantially smaller than the stoichiometric amount calculated for the reaction, in this case the splitting of the reactive group. That is, the amount employed is a sub-stoichiometric amount. However, this amount calculated from the dyestuff may be varied within wide limits and depends on one hand on the accelerating effect of the amine used and on the other hand on the desired degree of acceleration. Referred to the amount of dyestuff there may be used about 0.1 to 10 percent by weight and preferably about 0.2 to 2 percent by weight. The other dyeing and printing conditions are those conventionally used for reactive dyestuffs. When dyeing or printing cellulosic textile materials it is of advantage to use concomitantly inorganic acid-binding agents, such as alkali metal carbonates, hydroxides, bicarbonates or phosphates or a mixture of these compounds. In dyeing with reactive vat dyestuffs the conventional reaction agents may be used, such as sodium hydrosulfite, thiourea dioxide, sodium sulfide or sodium sulphoxylate. Furthermore, there may also be added to the dyebath and printing paste the usual additives such as electrolytes, for example sodium chloride or acetate, or nonelectrolytes such as urea or thickening agents such as alginates; as a rule, the tertiary amine is added to the dyebath or to the printing paste. When a two-stage dyeing method is used in which the application of the dyestuff and its fixation by means of an acid-binding agent are performed in two separate operations, the amine may alternatively be added only in the second stage. When dyeing or printing in a neutral to acidic medium, for example in the case of nitrogenous textile fibers or leather, it is of advantage to use water-soluble salts of the tertiary amines. The same applies to the case in which simultaneously the material is dressed with a curable aminoplast, for example a condensation product of formaldehyde with melamine or urea.

As mentioned above the fibrous materials are dyed or printed under the conditions conventionally used with reactive dyestuffs. The present process enables the reaction times and/or the reaction temperature to be reduced and/or to achieve dyeings or prints of greater tinctorial strength, for example in the cold pad bath method, in the exhaustion dyeing method and in printing. Moreover the stability of the dyeing liquors or printing pastes can be considerably enhanced by the addition of a catalytic quantity of a tertiary amine.

Unless otherwise indicated, parts and percentages in the following examples are by weight. The dyestuffs are generally shown as free acids but are used in the form of their alkali metal salts.

*Example 1*

30 parts of the dyestuff of the formula

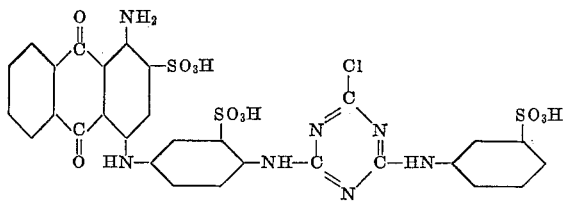

are dissolved in 800 parts of boiling water. The solution is cooled to 20° C. and mixed with 10 parts by volume of sodium hydroxide solution of 30% strength, 20 parts of crystalline sodium sulfate and 0.05 to 0.2 part of 1:4-diaza-bicyclo-(2:2:2)-octane of the formula

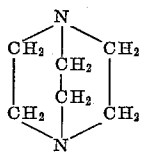

and the resulting solution is made up with cold water to 1000 parts.

A cotton fabric is padded with the above solution to a weight increase of 75%, immediately reeled up and left itself in this state for 6 to 12 hours at 20° C. After this period of storage the unfixed portion of dyestuff is removed by a thorough rinse in cold water and boiling water, and the fabric is finally soaped in the usual manner.

The above procedure produces a blue dyeing having good fastness to light and washing and considerably greater tinctorial strength than a comparable dyeing carried out without addition of 1:4-diaza-bicyclo-(2:2:2)-octane.

Similarly good results are obtained by using quinuclidine or quinuclidone instead of 1:4-diaza-bicyclo-(2:2:2)-octane.

When 15 parts of trisodium phosphate are used instead of 10 parts by volume of sodium hydroxide solution, good results are likewise obtained.

*Example 2*

A cotton fabric is impregnated at 50° C. with a padding solution containing in 1000 parts of water 25 parts of the dyestuff of the formula

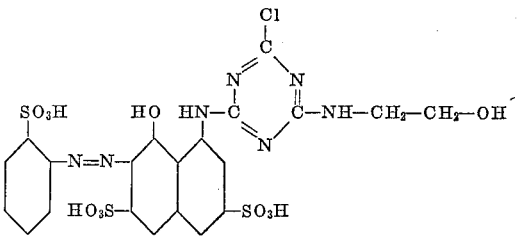

and then dried. The dry fabric is padded with a solution containing in 1000 parts of water, 200 parts of calcined sodium sulfate, 10 parts by volume of sodium hydroxide solution of 30% strength and 0.05 to 0.2 part of 1:4-diaza-bicyclo-(2:2:2)-octane. The fabric is kept in the reeled-up state at room temperature for 3 to 6 hours and then finished off as described in Example 1.

The resulting brilliant red dyeing has distinctly greater tinctorial strength than a comparable dyeing produced without adding 1:4-diaza-bicyclo-(2:2:2)-octane.

Similarly good results are obtained by using trimethylamine, 1:6-bis-dimethylamino-hexane or quinuclidone instead of 1:4-diaza-bicyclo-(2:2:2)-octane.

*Example 3*

A solution of 1.5 parts of the dyestuff of the formula

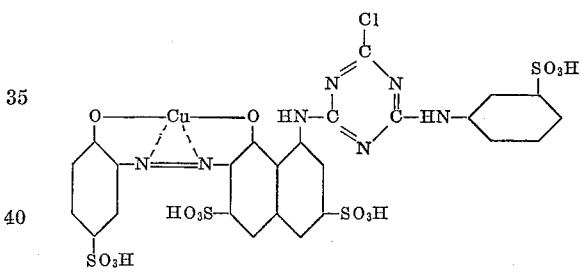

in 250 parts of boiling water is added to a dyebath containing in 750 parts of water 60 parts of sodium chloride, and the resulting dyebath is used to dye 50 parts of cotton yarn for 30 minutes at 40° C. The fixation of the dyestuff deposited on the fiber is then carried out after this exhaustion process in the same dyebath by adding 15 parts of trisodium phosphate and 0.02 part of 1:4-diaza-bicyclo-(2:2:2)-octane. The fixation takes 1½ hours at 40° C. The dyed yarn is thoroughly rinsed in cold and in hot water and finally soaped at the boil. The resulting brilliant violet dyeing displays good fastness properties and is of considerably greater tinctorial strength than a dyeing produced without adding 1:4-diaza-bicyclic-(2:2:2)-octane.

When the dyestuff used above is replaced by an equivalent amount of the dyestuff of the formula

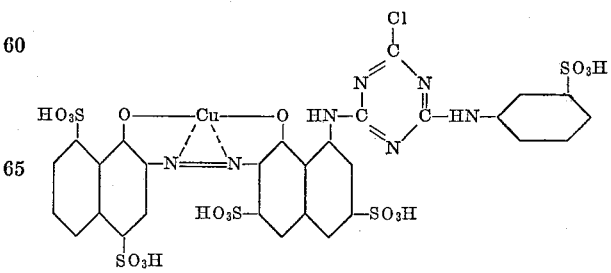

or $$Cu-Pc \underbrace{\phantom{XXX}}_{3} \begin{cases} -(SO_3H)_{2.5} \\ -(SO_2-NH-CH_2-CH_2-Cl)_{1.5} \end{cases}$$

(where Cu—Pc represents the radical of copper phthalocyanine) good results are likewise obtained. Similarly good results are obtained by using trimethylamine or 1:6-bis-dimethylamino-hexane or quinuclidone instead of 1:4-diaza-bicyclo-(2:2:2)-octane.

*Example 4*

A solution of 1.5 parts of the dyestuff of the formula

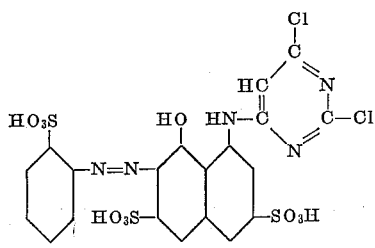

in 250 parts of boiling water is added to a dyebath containing in 750 parts of water 60 parts of sodium chloride. The resulting dye liquor is used to dye 50 parts of cotton yarn for 30 minutes at 40° C. This fixation of the dyestuff deposited on the fiber follows this exhaustion process and is performed in the same dyebath after adding 20 parts of sodium carbonate and 0.12 parts of trimethylamine. The fixation takes 1½ hours at 40° C. The dyed yarn is thoroughly rinsed with cold and hot water and then soaped at the boil.

The brilliant red dyeing so obtained has good properties of fastness and its tinctorial strength is substantially greater than that of a dyeing produced without addition of trimethylamine.

Good results are also obtained when the dyestuff used above is replaced by an equivalent amount of the dyestuff of the formula

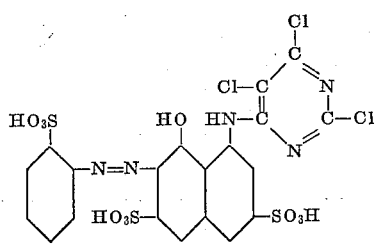

*Example 5*

A solution of 1.5 parts of the dyestuc of the formula

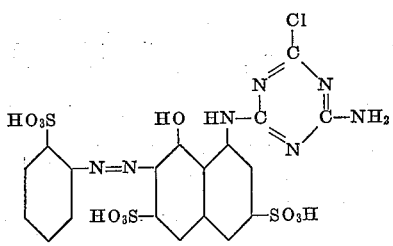

in 250 parts of boiling water is added to a dyebath containing in 750 parts of water 60 parts of sodium chloride. The resulting dye liquor is used to dye 50 parts of cotton yarn for 30 minutes at 40° C. The fixation of the dyestuff deposited on the fibers follows upon this exhaustion process and is performed in the same dyebath after having added to it 20 parts of sodium carbonate and 0.15 part of 1:6-bis-dimethylamino-hexane. The fixation takes 1½ hours at 40° C. The dyed yarn is thoroughly rinsed in cold and hot water and then soaped at the boil.

The resulting red dyeing has good properties of fastness and its tinctorial strength is substantially greater than that of a dyeing produced without addition of 1:6-bis-dimethylamino-hexane.

Similarly good results are obtained by using 1:2-bis-dimethylamino-ethane or dimethyl-benzylamine instead of 1:6-bis-dimethylamino-hexane.

*Example 6*

30 parts of the dyestuff mentioned in Example 2 are mixed with 50 parts of urea and dissolved in 700 parts of boiling water. The solution is cooled to 40° C., mixed with 20 parts of sodium carbonate and 0.2 part of 1:4-diaza-bicyclo-(2:2:2)-octane, and the solution is then made up with cold water to 1000 parts.

A cotton fabric is padded with this solution to a weight increase of 75% and then steamed directly, that is to say without intermediate drying, for one hour in an air-free steamer. The steamed fabric is then rinsed and soaped in the usual manner.

The resulting brilliant red dyeing has very good fastness to light and washing. When the same procedure is followed but 1:4-diaza-bicyclo-(2:2:2)-octane is omitted, a substantially weaker dyeing results.

*Example 7*

A mixture of 20 parts of the dyestuff of the formula

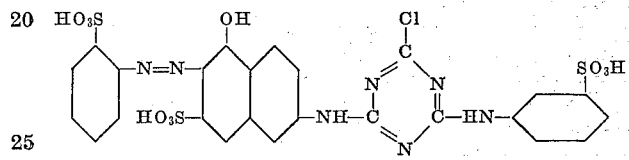

and 40 parts of urea is dissolved in 600 parts of boiling water. The solution is cooled to 40° C. and then mixed with 20 parts of sodium carbonate and 0.2 part of 1:4-diaza-bicyclo-(2:2:2)-octane. The whole is then made up with cold water to 1000 parts.

A cotton fabric is padded with the above solution to a weight increase of 70% and then reeled up and so stored in a pad-roll installation for one hour at a wet-bulb temperature of 80° C. The fabric is then thoroughly rinsed in cold and hot water and soaped at the boil.

The resulting deep orange dyeing has very good fastness to light and washing and considerably greater tinctorial strength than a dyeing produced in the same manner but without addition of 1:4-diaza-bicyclo-(2:2:2)-octane.

*Example 8*

A cotton fabric is padded with a solution of 3 parts of the dyestuff of Example 1 in 100 parts of water to a weight increase of 70%. The fabric is subjected to intermediate drying and then impregnated with a solution of 250 parts of sodium chloride, 6 parts of sodium hydroxide of 100% strength and 0.1 part of 1:4-diaza-bicyclo-(2:2:2)-octane in 900 parts of water until the fabric shows a weight increase of 80%. Immediately thereafter the fabric is steamed for 30 seconds in steam of 103 to 110° C. then thoroughly rinsed in cold and in hot water, washed for 5 minutes at the boil with addition of soap and finally dried:

The resulting brilliant blue dyeing has very good fastness to light and washing. When the same procedure is adopted but without addition of 1:4-diaza-bicyclo-(2:2:2)-octane a considerably weaker dyeing results.

*Example 9*

A mixture of 200 parts of urea and 40 parts of the 1:2-chromium complex containing for every atom of chromium 2 molecules of the dyestuff of the formula

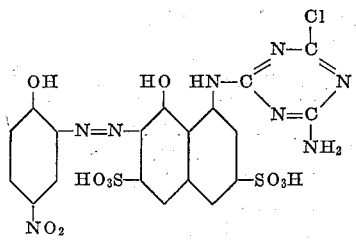

is dissolved in 870 parts of hot water and the solution is cooled to room temperature. 20 parts of sodium carbonate and 1 part of 1:4-diaza-bicyclo-(2:2:2)-octane are then strewn into the solution and caused to dissolve by stirring. A mercerized cotton fabric is impregnated with this solution to a weight increase of 70%. The fabric is then dried in a current of hot air until the cotton still displays a moisture content of 8%. The fabric is then thoroughly rinsed in cold and in boiling water and dried.

The resulting, covered, greenish blue dyeing has very good wet fastness properties.

A dyeing produced in the same manner but without addition of 1:4-diaza-bicyclo-(2:2:2)-octane is substantially lighter.

Example 10

A printing paste is prepared from the following ingredients:

50 parts of the dyestuff of Example 2
200 parts of urea
389.8 parts of water
350 parts of sodium alginate thickening 50:1000
0.2 part of 1:4-diaza-bicyclo-(2:2:2)-octane
10 parts of sodium meta-nitrobenzenesulfonate 1000 parts The above printing paste is printed on a cotton fabric on a roller printing machine. The fabric is dried and then steamed for 3 minutes at 100° C. in a Mather-Platt ager. The fixed print is rinsed in cold and in hot water and dried; the resulting red print has the same tinctorial strength as one that has been fixed for 8 minutes without addition of 1:4-diaza-bicyclo-(2:2:2)-octane.

A similarly good result is achieved on a spun rayon fabric.

Example 11

A printing paste is prepared from the following ingredients:

50 parts of the dyestuff mentioned in the second place in Example 3
200 parts of urea
579 parts of water
350 parts of sodium alginate thickening 50:1000
10 parts of sodium bicarbonate
1 part of 1:4-diaza-bicyclo-(2:2:2)-octane
10 parts of sodium meta-nitrobenzenesulfonate 1000 parts The above printing paste is applied by means of a roller printing machine to a cotton fabric which is then dried and thereupon fixed for 30 seconds in a rapid ager. The finishing of the print follows the procedure described in Example 10.

The resulting blue print is of the same tinctorial strength as one that was fixed for 8 minutes without addition of 1:4-diaza-bicyclo-(2:2:2)-octane. A similarly good result is obtained on a spun rayon fabric.

Example 12

A printing paste is prepared from the following ingredients:

50 parts of the dyestuff of the formula shown below
200 parts of urea
329 parts of water
350 parts of sodium alginate thickening 50:1000
60 parts of aqueous potassium carbonate solution of 50% strength
1 part of 1:4-diaza-bicyclo-(2:2:2)-octane
10 parts of sodium meta-nitrobenzenesulfonate 1000 parts A cotton fabric is printed with the above printing paste on a roller printing machine, dried and then steamed for 30 seconds in a rapid ager. The fabric is then finished off as described in Example 10.

The resulting turquoise print has substantially greater tinctorial strength than when fixed for 8 minutes without addition of 1:4-diaza-bicyclo-(2:2:2)-octane.

The dyestuff used in this example corresponds to the formula

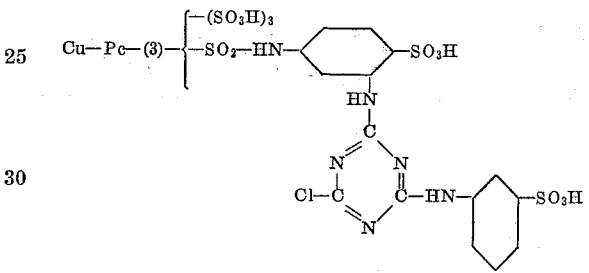

where Cu—Pc represents the copper phthalocyanine radical.

Example 13

A cellulose fabric is padded at 20 to 30° C. with a solution containing per 1000 parts of water 10 parts of sodium hydroxide solution of 30% strength, 100 parts of sodium sulfide, 20 parts of the dyestuff of the formula

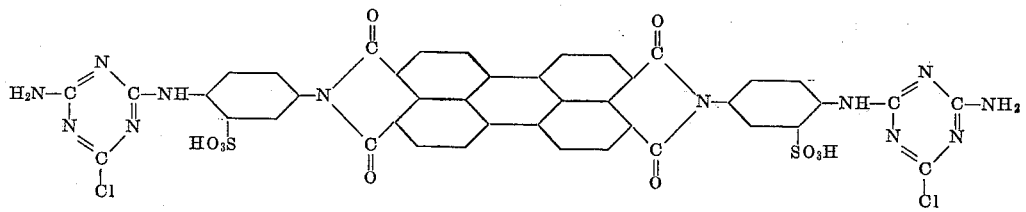

and 0.1 part of 1:4-diaza-bicyclo-(2:2:2)-octane. The fabric is then reeled up, wrapped in a plastic foil, stored for 6 hours, then rinsed, oxidised, soaped at the boil, once more rinsed and dried. The resulting red dyeing is fast to light.

Example 14

A mercerised cotton fabric is padded to a weight increase of 70% with a solution containing per 1000 parts of water 30 parts of the dyestuff mentioned in the first place in Example 3. With or without being subjected to intermediate drying the impregnated fabric is then fixed for 2 minutes at 80° C. in a bath containing in 1000 parts of water 15 parts of trisodium phosphate, 200 parts of sodium chloride and 0.5 part of 1:4-diaza-bicyclo-(2:2:2)-octane. The fixed fabric is thoroughly rinsed in cold and in boiling water and soaped as usual. The resulting deep blue dyeing has good properties of fastness.

A comparable dyeing produced without addition of 1:4-diaza-bicyclo-(2:2:2)-octane displays a much weaker tint.

When the dyestuff used above is replaced by the dyestuff of the formula

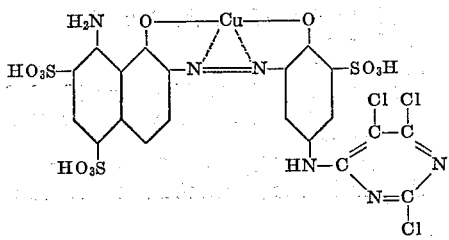

(prepared by condensing the copper complex of the basic aminoazo dyestuff with tetrachloropyrimidine in an aqueous medium at a pH value from 6 to 9) similar results are obtained.

*Example 15*

A cotton fabric is padded at room temperature to a weight increase of 70% with a solution containing per 1000 parts of water 0.5 part of 1:4-diaza-bicyclo-(2:2:2)-octane.

The fabric so pretreated is then impregnated with a dyestuff solution containing per 1000 parts of water 30 parts of the dyestuff mentioned in the first place in Example 3, 50 parts of urea and 20 parts of sodium carbonate.

Without intermediate drying the fabric is then steamed for one minute, preferably in an air-free steamer. Rinsing and soaping is performed as in Example 14.

The resulting brilliant violet dyeing has good fastness to light and washing.

*Example 16*

A printing paste is prepared from the following ingredients:

- 50 parts of the coupling component of the formula

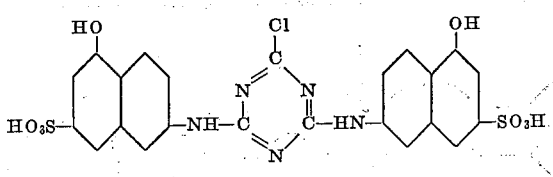

200 parts of urea
359 parts of water
370 parts of sodium alginate thickening 50:1000
10 parts of sodium bicarbonate
1 part of 1:4-diaza-bicyclo-(2:2:2)-octane
10 parts of sodium meta-nitrobenzenesulfonate
_____
1000 parts A cotton fabric is printed with the above paste on a roller printing machine and dried, then fixed for 30 seconds in a rapid steamer, and rinsed in cold and hot water. The resulting colorless prints obtained in this manner are developed for 10 minutes at 25° C. in a bath containing per 1000 parts of water 2 parts of diazotized ortho-chloraniline, then thoroughly rinsed in cold and hot water.

The resulting orange print has good properties of general fastness. When 1:4-diaza-bicyclo-(2:2:2)-octane is omitted, a weaker print results.

When ortho-chloraniline is replaced by 2 parts of diazotized ortho-nitraniline, an orange print is obtained which has identical properties.

When ortho-chloraniline is replaced by 2 parts of para-nitro-ortho-anisidine, a red print is obtained which has identical properties.

When the printing paste is prepared with the coupling component of the formula

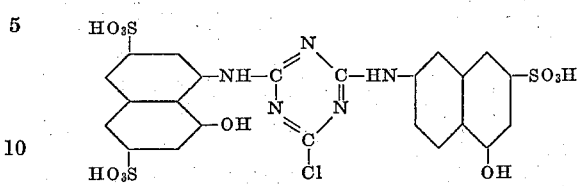

and in other respects the procedure described above is adopted, diazotized ortho-chloraniline produces a red print, diazotized ortho-nitraniline a bluish red print and diazotized para-nitro-ortho-anisidine a violet print in good yield.

When 1:4-diaza-bicyclo-(2:2:2)-octane is omitted, the resulting prints are weaker.

*Example 17*

A printing paste is prepared from the following ingredients:

50 parts of the dyestuff used in Example 2
200 parts of urea
350 parts of sodium alginate thickening 50:1000
379 parts of water
10 parts of sodium bicarbonate
1 part of 1:4-diaza-bicyclo-(2:2:2)-octane
10 parts of sodium meta-nitrobenzenesulfonate
_____
1000 parts A cotton fabric is printed with this paste with the aid of a roller printing machine and then, without intermediate drying, fixed for 2 minutes in dry heat at 150° C. The fabric is finished off as described in Example 1.

A red print is obtained. When 1:4-diaza-bicyclo-(2:2:2)-octane is omitted the resulting print is much weaker.

*Example 18*

A cotton fabric is printed with the printing paste described in Example 17 and then dried. The dried prints are fixed for 10 seconds with the aid of an infra-red drier and finished off as described in Example 17.

The resulting red print is as strong as the print of Example 17. When 1:4-diaza-bicyclo-(2:2:2)-octane is omitted the resulting print is of inferior tinctorial strength.

*Example 19*

A cotton fabric is printed with the printing paste of Example 17, dried and then fixed for one minute in dry heat and finished off as described in Example 1.

The resulting red print is as strong as that obtained in Example 17. When 1:4-diaza-bicyclo-(2:2:2)-octane is omitted a substantially weaker print results.

*Example 20*

A solution of 0.6 part of the dyestuff used in Example 2 in 100 parts of hot water is added to a dyebath containing in 900 parts of water 50 parts of sodium chloride. 20 parts of natural silk are dyed in the resulting dyebath for 30 minutes at 40° C. The dyestuff which has deposited only on the surface of the fiber is fixed by the addition of 2 parts of sodium carbonate and 0.06 part of 1:4-diaza-bicyclo-(2:2:2)-octane for 90 minutes, likewise at 40° C.; the fabric is then thoroughly rinsed in cold and hot water and finally soaped at 70° C.

The resulting brilliant red dyeing is fast to light and washing and of much greater tinctorial strength than a comparable dyeing prepared without addition of 1:4-diaza-bicyclo-(2:2:2)-octane.

When the dyestuff used above is replaced by an equivalent amount of the diazo-dyestuff of the formula

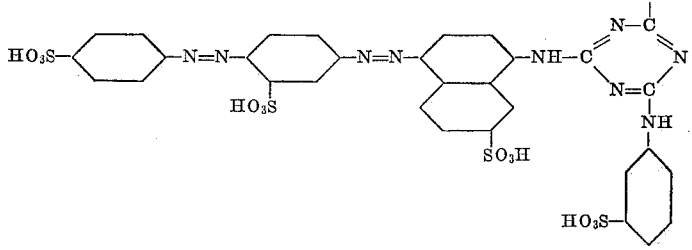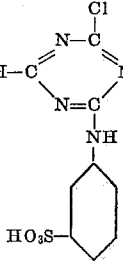

a yellowish brown dyeing is obtained.

Example 21

A solution of 40 parts of the coupling component of the formula

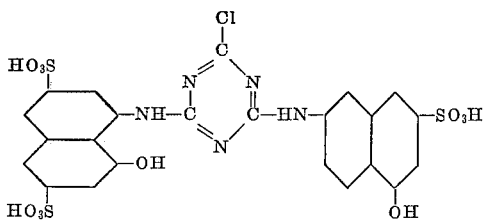

in 929.8 parts of water is mixed with 10 parts of a sodium hydroxide solution of 30% strength, 20 parts of crystalline sodium sulfate and 0.2 part of 1:4-diaza-bicyclo-(2:2:2)-octane.

A mercerized cotton fabric is padded with the above solution, reeled up and stored for 3 hours at a constant temperature of 30° C. After this storing the unfixed portion of dyestuff is washed out by thoroughly rinsing the fabric in cold and in hot water.

The fabric impregnated in this manner is then dissolved with a freshly prepared solution containing in 1000 parts of water 2 parts of the diazo compound of meta-chloraniline. After coupling the fabric is rinsed and soaped at the boil. The resulting brillant scarlet dyeing has good fastness to washing and rubbing.

A comparable dyeing produced without addition of 1:4-diaza-bicyclo-(2:2:2)-octane is considerably weaker.

When the development is carried out with 2 parts (per 1000 parts of water) of diazotized para-nitro-ortho-anisidine instead of with meta-chloraniline, a deep claret dyeing is obtained which has good properties of general fastness and is likewise substantially stronger than a comparable dyeing produced without addition of 1:4-diaza-bicyclo-(2:2:2)-octane.

Example 22

A mixture of 6 parts of the coupling component of the formula

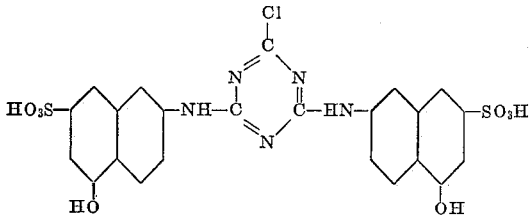

and 60 parts of sodium chloride is dissolved in 1000 parts of water at 70° C. This solution is used to dye 50 parts of cotton tricot for 30 minutes at a temperature of 70° C. The fabric is then fixed in the same bath by addition of 15 parts of crystalline trisodium phosphate and 0.2 part 1:4-diaza-bicyclo-(2:2:2)-octane for 90 minutes at 70° C. After this exhaustion treatment the unfixed portion of the coupling component is washed out in cold and in hot water.

The tricot treated in this manner is then coupled in a solution containing per 1000 parts of water 2 parts of the freshly prepared diazo compound of para-nitro-ortho-anisidine and finished off as described in Example 1.

The resulting strong brilliant red dyeing has good properties of fastness.

A dyeing prepared in identical manner but without addition of 1:4-diazo-bicyclo-(2:2:2)-octane was found to be substantially inferior in tinctorial strength.

Example 23

A mercerized cotton fabric is padded at 40° C. with a solution containing per 1000 parts of water 30 parts of the dyestuff used in Example 1, 200 parts of urea, 20 parts of sodium carbonate and 0.5 part of 1:4-diaza-bicyclo-(2:2:2)-octane. To fix the dyeing the impregnated fabric is exposed to the action of a high-frequency electric field; it is then rinsed in cold and hot water, soaped at the boil, once more rinsed and dried.

The resulting deep fast blue dyeing is of greater tinctorial strength than a comparable dyeing produced without addition of 1:4-diaza-bicyclo-(2:2:2)-octane.

Example 24

A cotton fabric is padded at 40° C. with a solution containing in 1000 parts of water, 30 parts of the dyestuff of the formula

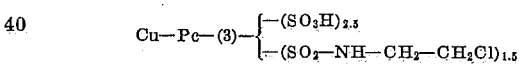

(where Cu—Pc represents the radical of copper phthalocyanine), 50 parts of urea, 20 parts of sodium carbonate and 0.2 part of 1:4-diaza-bicyclo-(2:2:2)-octane. The fabric is then dried at 60 to 80° and steamed for 30 seconds, preferably in an air-free steamer, then rinsed in cold and in hot water and soaped at the boil.

The resulting turquoise dyeing has good properties of fastness.

A dyeing prepared in identical manner but without addition of 1:4-diaza-bicyclo-(2:2:2)-octane revealed a substantially inferior yield of dyestuff.

Example 25

A solution of 10 parts of the dyestuff of the formula

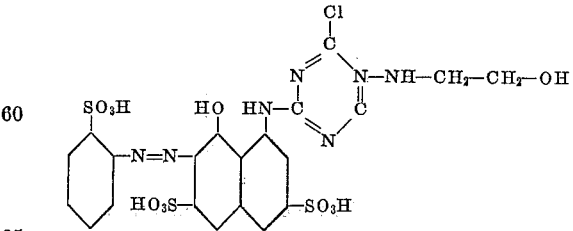

and 10 parts of the dyestuff of the formula:

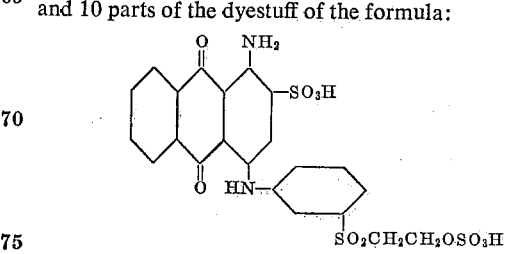

in 800 parts of warm water is cooled to 25° C. and then mixed with 15 parts of trisodium phosphate, 5 parts by volume of a sodium hydroxide solution of 30% strength and 0.2 part of 1:4-diaza-bicyclo-(2:2:2)-octane. The whole is then made up with cold water to 1000 parts by volume.

A cotton fabric is impregnated with the above solution, immediately reeled up and so kept for 4 hours at 25° C. After this storing the unfixed portion of dyestuff is washed out by thoroughly rinsing the fabric in cold and hot water and the fabric is then soaped at the boil.

The resulting violet dyeing is much deeper than when 1:4-diaza-bicyclo-(2:2:2)-octane is omitted.

*Example 26*

A mixture of 30 parts of the dyestuff of the formula $$Cu-Pc-(3)-\begin{cases}-(SO_3H)_2\\-SO_2NH_2\\-SO_2NH-\end{cases}$$ [structure with Cl, Cl, HN-C, C=C, N-C, Cl on triazine ring attached to phenyl]

(where Cu—Pc represents the copper phthalocyanine radical) and 20 parts of the dyestuff of the formula

[structure with Cl, CH3, N=C, HO3S-phenyl-N, C=C-N=N-phenyl-SO3H, Cl, triazine ring with HN-C, C-HN-phenyl, OH]

is dissolved in 800 parts of boiling water; the solution is cooled to 25° C. and mixed with 16 parts of trisodium phosphate, 8 parts by volume of sodium hydroxide solution of 30° C. and 0.2 part of 1:4-diaza-bicyclo-(2:2:2)-octane. The whole is then made up with cold water to 1000 parts by volume.

A cotton fabric is padded with this solution to a weight increase of 70%, reeled up and kept for 6 hours at a constant temperature of 25° C. The stored material is thoroughly rinsed in cold and hot water and finally soaped at the boil.

A brilliant yellowish green dyeing is obtained. A comparable combination dyeing without addition of 1:4-diaza-bicyclo-(2:2:2)-octane displays weaker tints.

*Example 27*

When the dyestuff shown in Example 26 are replaced by a combination of 30 parts of the dyestuff of Example 12 and 20 parts of the dyestuff of the formula

[structure: HO3S-O-CH2-CH2-SO2-phenyl-OCH3, -N=N-C with HO, C-N-phenyl-SO3H, Cl, CH3, C=N, H3C]

and dyeing is performed in identical manner, similarly good results are obtained.

*Example 28*

A printing paste is prepared from the following ingredients:

50 parts of the dyestuff of the formula of Example 24
200 parts of urea
329 parts of water
350 parts of sodium alginate thickening 50:1000
60 parts of an aqueous potassium carbonate solution of 50% strength
1 part of 1:4-diaza-bicyclo-(2:2:2)-octane
10 parts of sodium meta-nitrobenezenesulfonate ---
1000 parts A cotton fabric is printed with this paste on a roller printing machine, dried and then fixed for 30 seconds in a rapid steamer. The fabric is then finished off as described in Example 1.

The resulting turquoise print has good properties of fastness and is substantially stronger than when 1:4-diazabicyclo-(2:2:2)-octane is omitted.

*Example 29*

A printing paste is prepared from the following ingredients:

50 parts of the dyestuff of the formula

[structure with Cl, CH3, N=C, HO3S-phenyl-N, C=C-N=N-phenyl-SO3H, H, Cl, HN-C, C-C, N=C, Cl on triazine]

(obtained by condensing the basic aminoazo dyestuff with 2:4:6-trichloropyrimidine)
100 parts of urea
429 parts of water
400 parts of sodium alginate thickening 50:1000
10 parts of sodium bicarbonate
1 part of 1:4-diaza-bicyclo-(2:2:2)-octane
10 parts of sodium meta-nitrobenezenesulfonate ---
1000 parts A cotton fabric is printed with this paste on a roller printing machine or by the screen printing method. The fabric is dried and then fixed for 30 seconds in a rapid ager and finished off as described in Example 1. The resulting yellow print is of much greater tinctorial strength than when 1:4-diaza-bicyclo-(2:2:2)-octane is omitted.

*Example 30*

A printing paste is prepared from the following ingredients:

30 parts of the dyestuff of the formula shown in Example 24
420 parts of water
500 parts of sodium alginate thickening 50:1000

---
1000 parts

A cotton fabric is printed with this paste and then dried. The dried fabric is padded with a solution containing in 100 parts of water 150 parts of sodium chloride, 100 parts of potassium carbonate, 30 parts by volume of a sodium hydroxide solution of 30% strength and 1 part of 1:4-diaza-bicyclo-(2:2:2)-octane and squeezed to a residual liquor content of 70%, then without intermediate drying fixed for 30 seconds in a rapid ager and finished off as described in Example 1.

The resulting turquoise print is of considerably greater tinctorial strength than when 1:4-diaza-bicyclo-(2:2:2)-octane is omitted.

A similarly good result is obtained on a spun rayon fabric.

*Example 31*

A printing paste is prepared from the following ingredients:

30 parts of the dyestuff of the formula shown in Example 24
1 part of 1:4-diaza-bicyclo-(2:2:2)-octane
419 parts of water
500 parts of sodium alginate thickening 50:1000
_____
1000 parts A spun rayon fabric is printed with this paste, then dried and padded with a solution containing in 1000 parts of water 150 parts of sodium chloride, 100 parts of potassium carbonate and 30 parts by volume of a sodium hydroxide solution of 30% strength, squeezed to a residual liquor content of 70% and then, without intermediate drying, fixed in a rapid steamer for 30 seconds. The fabric is then finished off as described in Example 1.

The resulting turquoise print is of good tinctorial strength. When the same procedure is followed but without addition of 1:4-diaza-bicyclo-(2:2:2)-octane a considerably weaker print results.

An equally good result is obtained on a cotton fabric.

Example 32

A printing paste is prepared from the following ingredients:

20 parts of the 1:2-cobalt complex containing per atom of cobalt two molecules of the dyestuff of the formula

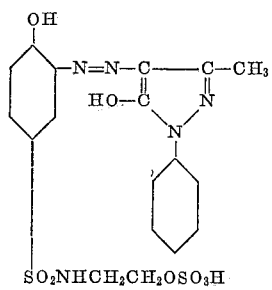

100 parts of urea
469 parts of water
350 parts of sodium alginate thickening 50:1000
50 parts of sodium bicarbonate
1 part of 1:4-diaza-bicyclo-(2:2:2)-octane
10 parts of sodium meta-nitrobenzenesulfonate
_____
1000 parts A cotton fabric is printed with this paste on a roller printing machine and dried, then fixed for 30 seconds in a rapid steamer and finished off as described in Example 1.

The resulting yellowish brown print is of considerably greater tinctorial strength than when 1:4-diaza-bicyclo-(2:2:2:)-octane is omitted.

Example 33

A solution of 4 parts of the dyestuff mentioned in the first place in Example 3 in 100 parts of water is used to pad a cotton fabric to a weight increase of 70%.

After an intermediate drying the fabric is conveyed through a solution of 250 parts of sodium chloride, 6 parts of sodium hydroxide of 100% strength and 1 part of 1:4-diaza-bicyclo-(2:2:2)-octane in 900 parts of water.. This bath is located over one leg of a molten metal bath shaped in the form of a U. The chemical solution and the metal bath have a temperature of 90° C. The fabric is first conveyed through the chemical bath and immediately thereafter through the metal bath. The time of residence of the fabric in the metal bath is 7 to 10 seconds. After it has left the metal bath the fabric is thoroughly rinsed in cold water and then for about 10 minutes in boiling water, and dried.

The resulting strong, violet dyeing has good properties of fastness.

When the same procedure is adopted but the 1:4-diazabicyclo-(2:2:2:)-octane is omitted from the chemical bath, a pale lilac dyeing results.

Example 34

A solution of 40 parts of the coupling component of the formula

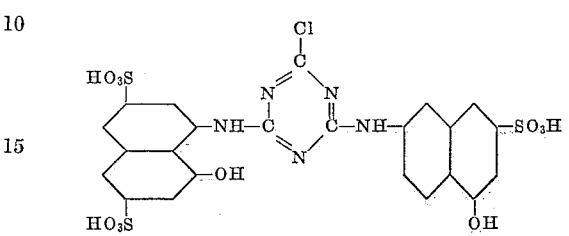

in 500 parts of water is mixed with a solution of 20 parts of the dyestuff of the formula shown in Example 1 in 449.8 parts of water, 30 parts by volume of a sodium hydroxide solution of 30% strength, 20 parts of crystalline sodium sulfate and 0.2 part of 1:4-diaza-bicyclo-(2:2:2)-octane.

A cotton fabric is padded with this solution, then reeled up and stored for 3 hours at a constant temperature of 30° C. After this storing the unfixed dyestuff is washed out by rinsing the fabric thoroughly in cold and in hot water.

The impregnated fabric is then coupled with a freshly prepared solution containing in 1000 parts of water 2 parts of the diazo compound of metachloraniline.

The resulting deep claret dyeing has good fastness to washing and rubbing.

A comparable dyeing produced without addition of 1:4-diaza-bicyclo-(2:2:2)-octane was of much weaker tinctorial strength.

Example 35

30 parts of the dyestuff of the formula

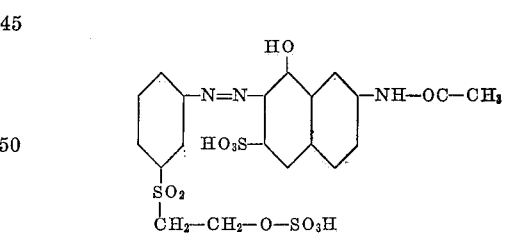

are dissolved in 800 parts of boiling water, the solution is cooled to 20° C. and treated with 20 parts of anhydrous sodium carbonate and 0.1 part of 1:4-diaza-bicyclo-(2:2:2-)octane. The resulting solution is made up to 1000 parts with cold water. A cotton fabric is padded with the solution until 75% of the liquid has been taken up, reeled up immediately and so kept for 24 hours at 20° C. Further processing is carried out as described in Example 1.

An orange dyeing of good fastness properties is obtained.

The resulting dyeing liquor is stable for over 24 hours, whereas when a solution of without 1:4-diaza-bicyclo-(2:2:2)-octane is used, the bulk of the dyestuff is inactivated after 24 hours owing to hydrolysis.

Example 36

A printing paste is prepared from the following ingredients:

30 parts of the dyestuff of the formula

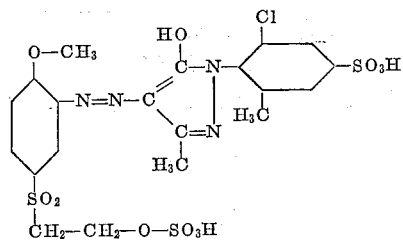

100 parts of urea
429 parts of water
30 parts of sodium bicarbonate
1 part of 1:4-diaza-bicycle-(2:2:2)-octane
10 parts of the sodium salt of nitrobenzene-meta-sulfonic acid
400 parts of sodium alginate thickening 50:1000

1000 parts

A cotton fabric is printed with this paste on a roller printing machine and then dried. It is then steamed for 8 minutes in a continuous steamer, rinsed, soaped at the boil for 30 minutes, rinsed and dried.

A yellow print having good properties of fastness is obtained.

The printing paste is distinguished by high stability to hydrolysis. If it is used for printing after 4 weeks' storage, the tinctorial strength is much greater than when 1:4-diaza-bicyclo-(2:2:2)-octane is omitted.

What is claimed is:

1. A process for coloring cellulosic fibrous material with reactive dyestuffs which comprises applying to the fibrous material an aqueous preparation containing the dyestuff and to which has been added in a substoichiometric amount calculated on the amount of dyestuff a tertiary amine of the formula

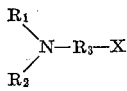

in which $R_1$ and $R_2$ each represents an aliphatic radical containing at most 4 carbon atoms, $R_3$ represents an aliphatic radical containing at most 10 carbon atoms, X represents a member selected from the group consisting of a hydrogen atom, a hydroxyl group, the group of the formula

or the group of the formula

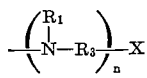

($R_1$, $R_2$, $R_3$ and X having the meaning given and $n$ standing for a whole number of at the most 4), and an aryl group.

2. A process for coloring cellulosic fibrous material with reactive dyestuffs which comprises applying to the fibrous material an aqueous preparation containing the dyestuff and to which has been added in a substoichiometric amount calculated on the amount of dyestuff a tertiary amine of the formula

in which $R_4$, $R_5$ and $R_6$ each represents an aliphatic radical containing at most 4 carbon atoms and Y stands for a member selected from the group consisting of a nitrogen atom and a $\rightarrow$CH group.

3. A process for coloring cellulosic fibrous material with reactive dyestuffs which comprises applying to the fibrous material an aqueous preparation containing the dyestuff and to which has been added in a substoichiometric amount calculated on the amount of dyestuff

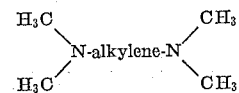

the alkylene radical of which contains at most 10 carbon atoms.

4. A process for coloring cellulosic fibrous material with reactive dyestuffs which comprises applying to the fibrous material an aqueous preparation containing the dyestuff and to which has been added in a substoichiometric amount calculated on the amount of dyestuff a tertiary amine of the formula

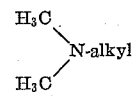

the alkyl radical of which contains at most 4 carbon atoms.

5. A process for coloring cellulosic fibrous material with reactive dyestuffs which comprises applying to the fibrous material an aqueous preparation containing the dyestuff and to which has been added in a substoichiometric amount calculated on the amount of dyestuff a tertiary amine of the formula

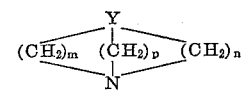

in which Y represents a member selected from the group consisting of a nitrogen atom and a $\rightarrow$CH group and $m$, $n$ and $p$ each stands for a whole number of at most 4.

6. A process for coloring cellulosic fibrous material with reactive dyestuffs which comprises applying to the fibrous material an aqueous preparation containing the dyestuff and to which has been added in a substoichiometric amount calculated on the amount of dyestuff the tertiary amine of the formula

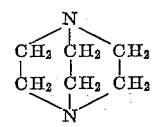

7. A process for coloring cellulosic fibrous material with reactive dyestuffs which comprises applying to the fibrous material an aqueous preparation containing the dyestuffs and to which has been added in a substoichiometric amount calculated on the amount of dyestuff quinuclidine.

8. A process for coloring cellulosic fibrous material with reactive dyestuffs which comprises applying to the fibrous material an aqueous preparation containing the dyestuff and to which has been added in a substoichiometric amount calculated on the amount of dyestuff quinuclidone.

9. A process for coloring cellulosic fibrous material with reactive dyestuffs which comprises applying to the fibrous material an aqueous preparation containing the dyestuff and to which has been added in a substoichiometric amount calculated on the amount of dyestuff trimethylamine.

10. A process for coloring cellulosic fibrous material with reactive dyestuffs which comprises applying to the fibrous material an aqueous preparation containing the dyestuff and to which has been added tertiary amine selected from the group consisting of a tertiary amine of the formula

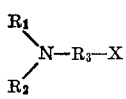

in which $R_1$ and $R_2$ each represents an aliphatic radical containing at most 4 carbon atoms, $R_3$ represents an aliphatic radical containing at most 10 carbon atoms, X represents a member selected from the group consisting of a hydrogen atom, a hydroxyl group, the group of the formula

or the group of the formula

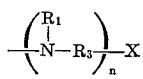

($R_1$, $R_2$, $R_3$ and X having the meaning given and $n$ standing for a whole number of at the most 4), and an aryl group and a tertiary amine of the formula

in which $R_4$, $R_5$ and $R_6$ each represents an aliphatic radical containing at most 4 carbon atoms and Y stands for a member selected from the group consisting of a nitrogen atom and a $>$CH group, said tertiary amine being present in an amount of from about 0.1 to 10% by weight on the weight of the dyestuff.

References Cited by the Examiner

UNITED STATES PATENTS

| | | | |
|---|---|---|---|
| 2,190,848 | 2/40 | Petersen et al. | 260—249.5 |
| 2,192,127 | 2/40 | Ebel et al. | 260—249.6 |
| 2,235,480 | 3/41 | Graenacher et al. | 260—249.6 |
| 2,873,269 | 2/59 | Fasciati et al. | 8—1.2 |
| 2,900,218 | 8/59 | Gray | 8—85 |
| 3,116,103 | 12/63 | Gamlen et al. | 8—54.2 X |

FOREIGN PATENTS 174,377  3/53  Austria.

NORMAN G. TORCHIN, *Primary Examiner.*
ABRAHAM H. WINKELSTEIN, *Examiner.*